United States Patent
Shin

(10) Patent No.: US 8,848,845 B2
(45) Date of Patent: Sep. 30, 2014

(54) DETECTION AND AVOIDANCE APPARATUS AND METHOD FOR USE IN UWB RECEIVER

(75) Inventor: Cheol-ho Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 211 days.

(21) Appl. No.: 13/598,670

(22) Filed: Aug. 30, 2012

(65) Prior Publication Data

US 2013/0070812 A1    Mar. 21, 2013

(30) Foreign Application Priority Data

Sep. 16, 2011    (KR) .......................... 10-2011-0093432

(51) Int. Cl.
| | |
|---|---|
| H03D 1/04 | (2006.01) |
| H04B 1/7097 | (2011.01) |
| H04L 27/00 | (2006.01) |
| H04L 27/26 | (2006.01) |

(52) U.S. Cl.
CPC .......... *H04B 1/7097* (2013.01); *H04L 27/0006* (2013.01); *H04L 27/2691* (2013.01); *H04L 27/2647* (2013.01)
USPC ........................................................ 375/346

(58) Field of Classification Search
USPC .......................................... 375/346, 343, 324
See application file for complete search history.

(56) References Cited

U.S. PATENT DOCUMENTS

| | | | |
|---|---|---|---|
| 2007/0147236 | A1 | 6/2007 | Lee |
| 2008/0045175 | A1 | 2/2008 | Yoon et al. |
| 2008/0069181 | A1 | 3/2008 | Lee et al. |
| 2011/0128993 | A1* | 6/2011 | Chou ............................. 375/135 |
| 2013/0170590 | A1* | 7/2013 | Hyll et al. ..................... 375/343 |

FOREIGN PATENT DOCUMENTS

| | | |
|---|---|---|
| KR | 10-0766041 | 10/2007 |
| KR | 1020080016337 | 2/2008 |
| KR | 1020090118161 | 11/2009 |

* cited by examiner

*Primary Examiner* — Jaison Joseph
(74) *Attorney, Agent, or Firm* — Nelson Mullins Riley & Scarborough LLP; Anthony A. Laurentano, Esq.

(57) ABSTRACT

A DAA (Detection And Avoidance) apparatus for use in a UWB receiver includes a frequency offset unit for adding a preset frequency offset to a UWB signal including a victim signal and an FFT unit for performing a fast-Fourier-transformation on the UWB signal with the frequency offset added thereto. The DAA apparatus further includes a DAA unit for detecting a victim signal from the fast-Fourier-transformed UWB signal and, when reception power of the victim signal is higher than a predetermined reference power level, changing a communication channel for the UWB signal to avoid interference.

10 Claims, 8 Drawing Sheets

FO = 3 MHz

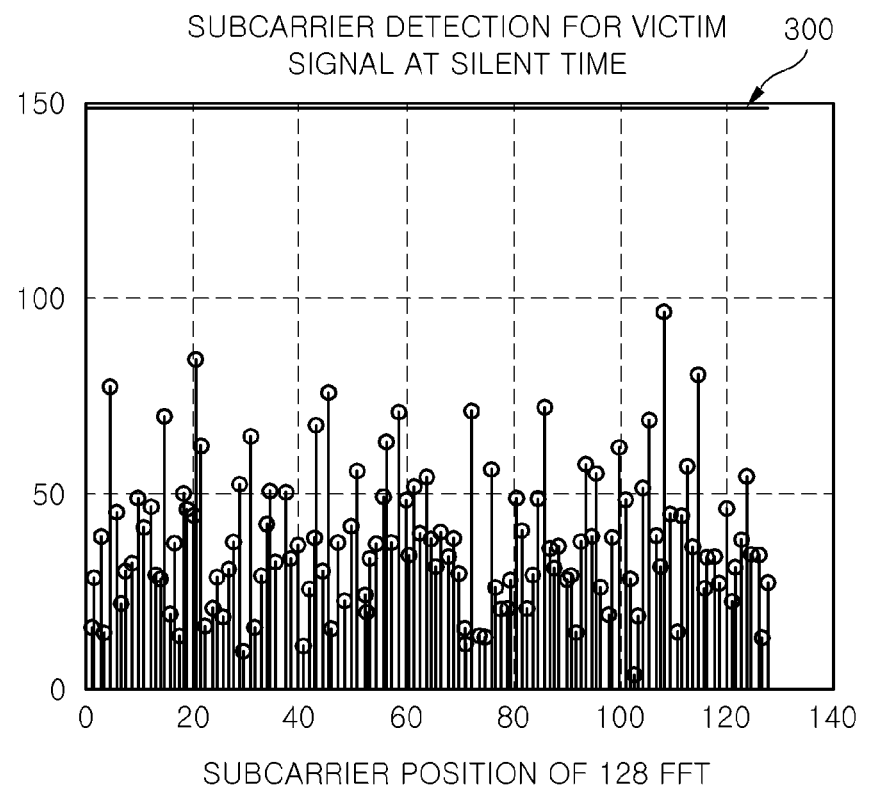

FIG.6

Foff = 80MHz, Fbw = 1.75 MHz

| FO(MHz) | DETECTION PROBABILITY OF VICTIM SIGNAL (%) |
|---|---|
| 0 | 0.9% |
| 1 | 3.4% |
| 2 | 97.4% |
| 3 | 97.5% |
| 4 | 1.8% | form a fast-Fourier-transformation on the UWB signal with the
DETECTION AND AVOIDANCE APPARATUS AND METHOD FOR USE IN UWB RECEIVER

RELATED APPLICATION(S)

This application claims the benefit of Korean Patent Application No. 10-2011-0093432, filed on Sep. 16, 2011, which is hereby incorporated by reference as if fully set forth herein.

FIELD OF THE INVENTION

The present invention relates an UWB (Ultra Wide-Band) receiver, and more particularly, to a Detection And Avoidance (DAA) apparatus and method of a UWB signal for accurately detecting a victim signal even when the frequency bandwidth of the victim signal is narrower than the subcarrier interval of the UWB signal.

BACKGROUND OF THE INVENTION

Recently, research is being actively conducted on a UWB communication that coexists with the existing wireless communication service without securing a separate frequency resource and enables a wireless communication using a high-speed wide band.

The UWB communication, which transmits data using very short pulses of several nano seconds, has several features different from the existing narrow band communication. The UWB communication fundamentally transmits a signal using a pulse, and thus has a wide frequency band and a low transmission power density. Since the UWB communication uses a wide bandwidth and has relatively low power consumption, the UWB communication can transmit data at a high speed, perform multiple accesses, and perform a communication even in a band less than a noise band. However, the UWB communication may collide with the service band of a different wireless communication network due to the use of the wide bandwidth. Therefore, each country defines the limit of an emission power of the UWB communication so as not to interfere with the existing channels. In other words, each country has licensed the UWB communication service on the assumption that the service band of the UWB communication interfering with that of a specific wireless communication maintains power to less than reference power.

For example, in order to protect the existing communication system and a communication system that may be introduced in the future, some countries, e.g., Europe, Japan, China, and Korea other than the USA regulate a technology reference that needs to detect the other communication signal having a certain level and take a measure for protecting the other communication system using the detected communication signal for the purpose of using the UWB system in a specific frequency band.

To date, a definite global common reference has not been determined for the kind of a victim signal and a victim signal detection level for applying an avoidance technology reference that is being discussed for allowing the MB-OFDM (Multi-Band Orthogonal Frequency Division Multiplexing Ultra Wide Band) UWB communication in a band of 3.1 GHz to 4.8 GHz, and the victim signal detection level for applying DAA (Detection And Avoidance) technology to a UWB communication system or a victim communication system to be protected is being established according to the condition of each country. Also, a DAA technology reference is being discussed mainly on the setting of the victim signal detection level for protecting a victim signal and the avoidance algorithm that is applicable according to the victim signal detection level.

FIG. 1 exemplarily shows a subcarrier interval and a victim signal position of a narrow band disposed within the subcarrier interval in the 128 FFT window of an MB-OFDM UWB system. Particularly, in FIG. 1, the victim signal has an occupied bandwidth narrower than the subcarrier interval of a Fast Fourier Transform (FFT) module of an MB-OFDM UWB receiver, of which the occupied bandwidth is 1.75 MHz and a frequency offset is 80 MHz. A subcarrier interval of MB-OFDM is 4.125 MHz, and thus, when the frequency bandwidth of a victim signal to be detected is 1.75 MHz and a center frequency is 80 MHz, the victim signal is disposed between 79.125 MHz and 80.875 MHz. In this case, in FFT of MB-OFDM UWB, the position of a subcarrier number 19 is 78.375 MHz, the position of a subcarrier number 20 is 82.5 MHz, and the position of a subcarrier number 21 is 86.625 MHz. As such, a victim signal is disposed between the subcarrier number 19 and the subcarrier number 20 and thus is not detected in an MB-FFT result well.

FIG. 2 shows a detection result of a victim signal of a narrow band using the 128 FFT of an MB-OFDM UWB receiver. Particularly, FIG. 2 is an output result when a detection algorithm using FFT has been driven for a received victim signal as in FIG. 1. In FIG. 2, reference numeral 200 indicates a victim signal detection reference line. As known from FIG. 2, a victim signal having a frequency bandwidth narrower than a subcarrier interval is shown as not normally being detected.

As described above, when the frequency bandwidth of a victim signal such as a WiMAX (World Interoperability for Microwave Access) signal is narrower than a subcarrier frequency bandwidth used in the MB-OFDM UWB receiver, the MB-OFDM UWB receiver cannot accurately detect the victim signal disposed within a subcarrier interval to date.

SUMMARY OF THE INVENTION

In view of the above, the present invention provides a Detection And Avoidance (DAA) apparatus and method of a UWB signal for accurately detecting a victim signal even when the frequency bandwidth of the victim signal is narrower than the subcarrier interval of the UWB signal.

Embodiment of the present invention relates to a Detection And Avoidance (DAA) apparatus for use in a UWB (an ultra wide band) receiver. The DAA apparatus includes: an FFT input buffer that temporarily stores a UWB signal including a victim signal; a frequency offset unit for adding a preset frequency offset to the UWB signal; an FFT unit for performing a fast-Fourier-transformation on the UWB signal with the frequency offset added thereto; and a DAA unit for detecting a victim signal from the fast-Fourier-transformed UWB signal and, when reception power of the victim signal is higher than a predetermined reference power level, changing a communication channel for the UWB signal to avoid interference.

In the embodiment, the frequency offset unit selects the preset frequency offset within a range less than a frequency bandwidth of the victim signal, and the frequency offset unit calculates the number of times the preset frequency offset is added, and repeatedly adds the preset frequency offset to the UWB signal by the calculated number of times. The number of times is an integer portion in a value which is obtained by dividing an FFT subcarrier frequency interval of the UWB signal by the preset frequency offset.

In the embodiment, the victim signal is a WiMAX (World Interoperability for Microwave Access) signal.

In the embodiment, the frequency offset unit calculates an amount of a preset frequency offset Δϕ which is added to the victim signal, as expressed in the following Equation, $$\Delta\phi = \Delta f \cdot K$$

where, $0 \leq K \leq N$ where Δf is the preset frequency offset, K is the number of times the preset frequency offset is added, and N is the number of iterations in which the preset frequency offset is added.

Embodiment of the present invention relates to a method for Detection And Avoidance (DAA) in a UWB (an ultra wide band) receiver. The DAA method includes: setting a preset frequency offset within a frequency range less than a frequency bandwidth of a victim signal; adding the preset frequency offset to the victim signal; performing a fast-Fourier-transformation on an UWB signal including the victim signal; detecting a victim signal included in the fast-Fourier-transformed UWB signal; measuring reception power of the detected victim signal to check whether reception power of the detected victim signal is higher than a predetermined reference level; and changing a communication channel for the UWB signal when the reception power of the detected victim signal is higher than the predetermined reference level.

In the embodiment, the method further includes again adding the preset frequency offset to the victim signal when the victim signal has not been detected.

In the embodiment, the preset frequency offset is added the number of predetermined times, and the number of predetermined times is an integer portion in a value which is obtained by dividing an FFT subcarrier frequency interval of the UWB signal by the preset frequency offset.

In the embodiment, the victim signal is a WiMAX (World Interoperability for Microwave Access) signal.

BRIEF DESCRIPTION OF THE DRAWINGS

The above and other objects and features of the present invention will become apparent from the following description of embodiments given in conjunction with the accompanying drawings, in which:

FIGS. 3A to 3D are frequency waveform diagrams of victim signals using a preset frequency offset (FO) in accordance with an embodiment of the present invention;

FIG. 6 is a table showing an experiment result which has been obtained by calculating a detection probability of a victim signal in accordance with an embodiment of the present invention.

DETAILED DESCRIPTION OF THE EMBODIMENTS

Figure 1:
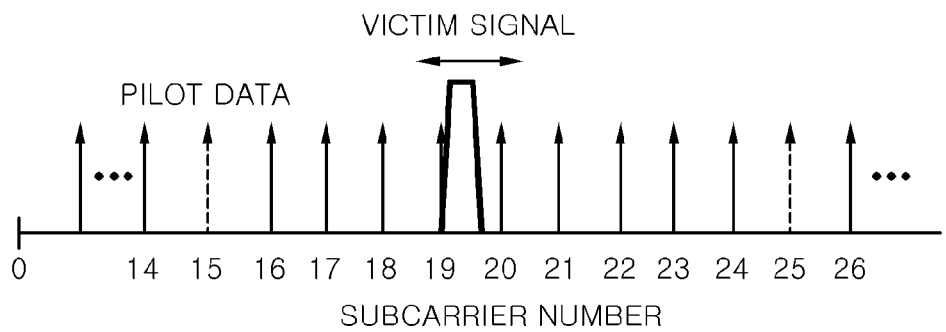
FIG. 1 exemplarily shows a subcarrier interval and a victim signal position of a narrow band disposed within the subcarrier interval in the 128 FFT window of an MB-OFDM UWB system in accordance with the related art.
Figure 2:
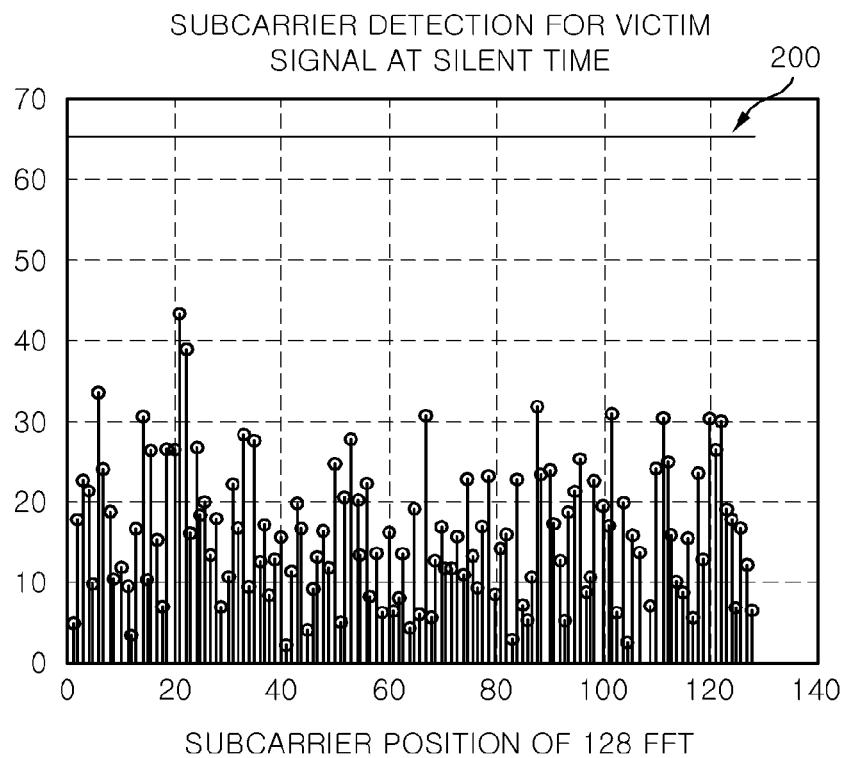
FIG. 2 shows a detection result of a victim signal of a narrow band using the 128 FFT of an MB-OFDM UWB receiver in accordance with the related art.

Hereinafter, embodiments of the present invention will be described in detail with reference to the accompanying drawings so that they can be readily implemented by those skilled in the art.

FIGS. 3A to 3D are frequency waveform diagrams of victim signals narrower than a subcarrier interval of MB-OFDM using FFT using a preset frequency offset (FO) in accordance with an embodiment of the present invention. Particularly, FIGS. 3A to 3D illustrate detection results of the victim signal that are obtained through the use of a victim signal detection algorithm using FFT when a preset frequency offset is added arbitrarily using NCO (numerically controlled oscillator) to the victim signal by 1 MHz each. In FIGS. 3A to 3D, reference numeral 300 indicates a victim signal detection reference line.

As shown in FIGS. 3A to 3D, an amount of a preset frequency offset is set as 1 MHz, the range of the preset frequency offset is set to 0 MHz to 4 MHz corresponding to a range less than 4.125 MHz which is an FFT subcarrier interval. In this case, the frequency axis position of a victim signal (included in a UWB signal), such as a WiMAX signal, is changed as follows.

Figure 3A:
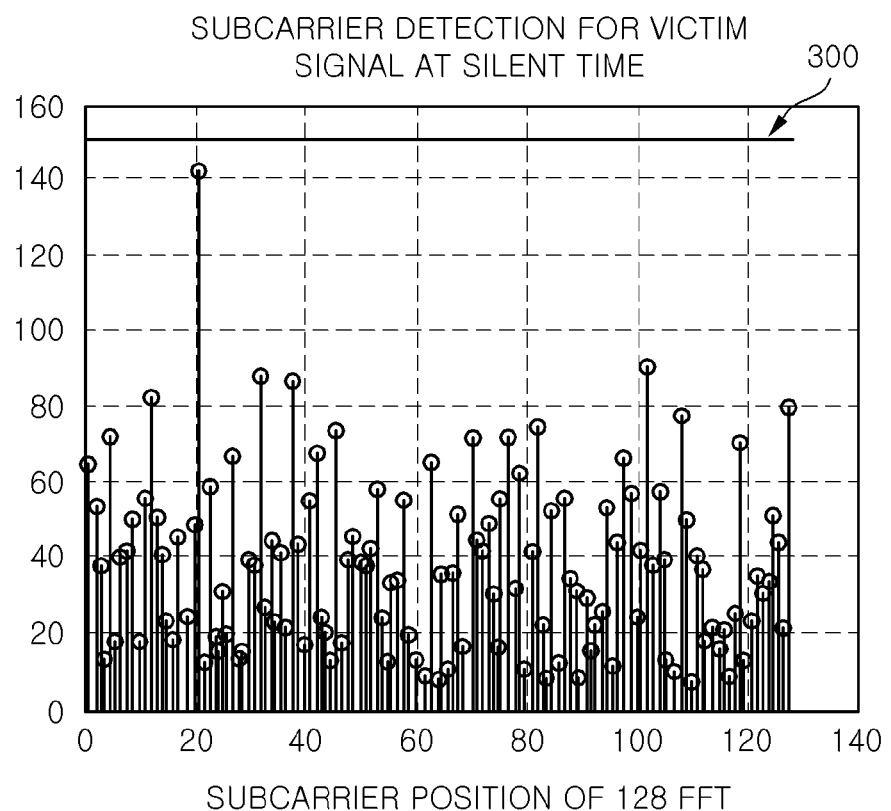

For example, it is assumed that the original frequency bandwidth of the victim signal is 79.125 MHz to 80.875 MHz. Then, when a frequency offset moves by 1 MHz, as shown in FIG. 3A, the frequency bandwidth of the victim signal becomes 80.125 MHz to 81.875 MHz that have been moved by 1 MHz from the original position.

Figure 3B:
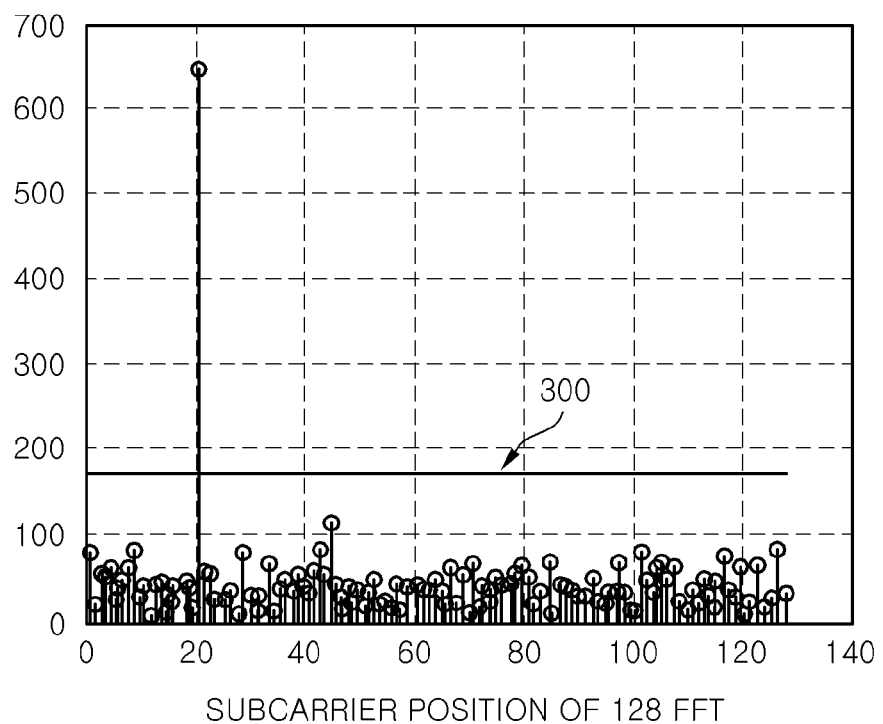

When a frequency offset moves by 2 MHz, the frequency bandwidth of the victim signal becomes 81.125 MHz to 82.875 MHz that have been moved by 2 MHz from the original position. As shown in FIG. 3B, it can be seen that the frequency bandwidth of the victim signal is detected from the position of a subcarrier number 20 among FFT subcarriers of the UWB signal.

Figure 3C:
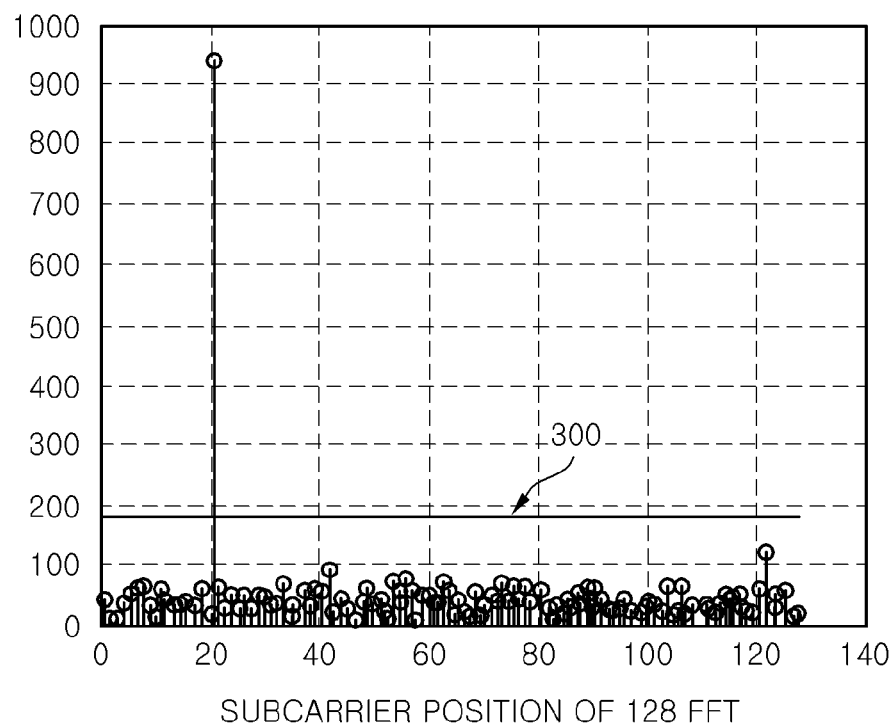

When a frequency offset moves by 3 MHz, the frequency bandwidth of the victim signal becomes 82.125 MHz to 83.875 MHz that have been moved by 3 MHz from the original position. As shown in FIG. 3C, it can be seen that the frequency bandwidth of the victim signal is detected from the position of the subcarrier number 20 among FFT subcarriers of the UWB signal.

When a frequency offset moves by 4 MHz, as shown in FIG. 3D, the frequency bandwidth of the victim signal becomes 83.125 MHz to 84.875 MHz that have been moved by 4 MHz from the original position. However, the frequency bandwidth of the victim signal is disposed within the FFT subcarrier interval of the UWB signal.

As described above, when a center frequency arbitrarily moves with respect to the victim signal to a frequency offset value included in a range of 0 MHz to 4 MHz that is a range less than 4.125 MHz which is the FFT subcarrier interval of the UWB signal, the frequency bandwidth of the victim signal corresponds to one of subcarriers of the UWB signal, and thus, the victim signal can be accurately detected even when the frequency bandwidth of the victim signal is narrower than the subcarrier interval of the UWB signal.

Figure 4:
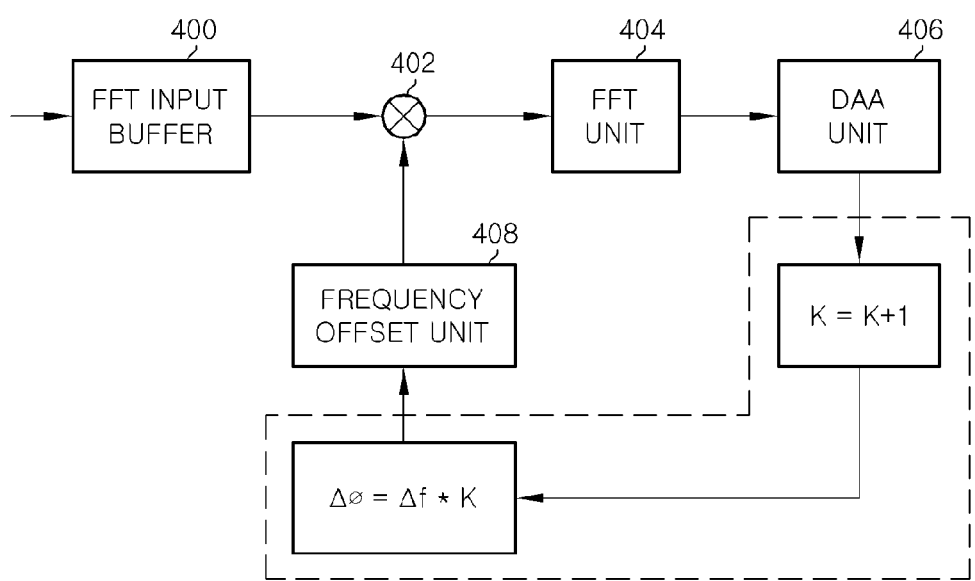
FIG. 4 is a block diagram of a DAA apparatus for use in an MB-OFDM UWB receiver in accordance with an embodiment of the present invention.

FIG. 4 is a block diagram of a DAA apparatus used in an MB-OFDM UWB receiver which detects a victim signal having a frequency bandwidth narrower than a subcarrier in accordance with an embodiment of the present invention.

An FFT input buffer 400 receives a UWB signal including a victim signal and temporarily stores the UWB signal. The victim signal has a frequency bandwidth narrower than the bandwidth of the FFT subcarrier of the MB-OFDM UWB receiver.

A frequency offset unit 408 generates a preset frequency offset to the victim signal. The frequency offset unit may be implemented with an NCO (numerically controlled oscillator). The preset frequency offset is determined by a DAA unit 406, and applied to a multiplier 402. The multiplier 402 adds the preset frequency offset to the UWB signal.

The FFT unit 404 performs a fast-Fourier-transformation on the UWB signal with the preset frequency offset added thereto, and applies the fast-Fourier-transformed UWB signal to the DAA unit 406.

The DAA unit 406 detects a victim signal from the fast-Fourier-transformed UWB signal. When the reception power of the victim signal is lower than a predetermined reference level, the DAA unit 406 changes an UWB communication channel to avoid interference. Also, the DAA unit 406 generates the preset frequency offset and supplies the preset frequency offset to the frequency offset unit 408.

In this case, the preset frequency offset $\Delta f$ may be defined as expressed in the following Equation (1), and the number of iterations N may be determined as a range that is expressed in the following Equation (2).

$$\Delta f \langle V_{BW} \qquad \text{Equation (1)}$$

where $\Delta f$ is a unit of a preset frequency offset to be added, and $V_{BW}$ denotes the frequency bandwidth of the victim signal.

$$N \langle \text{fix}(4.125/\Delta f) \qquad \text{Equation (2)}$$

where N denotes the number of iterations the preset frequency offset is added.

Figure 5:
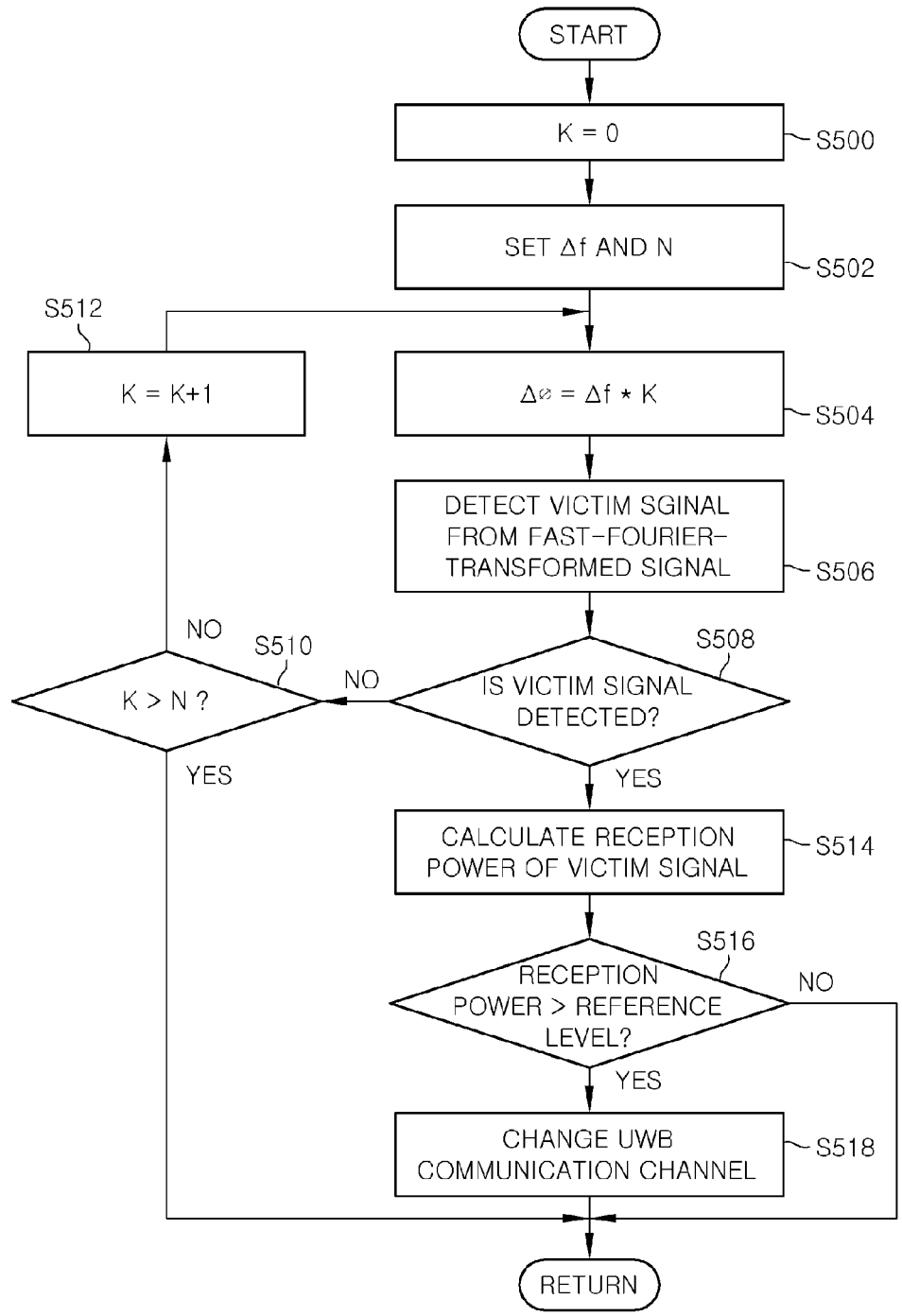
FIG. 5 is a flowchart illustrating a method of detecting a victim signal in the MB-OFDM UWB receiver in accordance with an embodiment of the present invention.

FIG. 5 is a flowchart illustrating a method of detecting a victim signal in the DAA apparatus for use in the MB-OFDM UWB receiver in accordance with an embodiment of the present invention.

Referring to FIG. 5, first, in operation S500, the DAA unit 406 sets the number of times K the preset frequency offset $\Delta f$ is added to "0". In operation S502, the DAA unit 406 then sets the preset frequency offset $\Delta f$ that is arbitrarily added to the victim signal and the number of iterations N in which the preset frequency offset is added. The preset frequency offset $\Delta f$ may be calculated as expressed in Equation (1), and the number of iterations N may be calculated as expressed in Equation (2).

As expressed in the following Equation (3), the DAA unit 406 calculates the amount of a preset frequency offset $\Delta \phi$, which is added before being inputted to the FFT unit 404, with respect to the UWB signal received by the FFT input buffer 400 in operation S504.

$$\Delta \phi = \Delta f \cdot K$$

where, $0 \leq K \leq N$ \qquad Equation (3)

The preset frequency offset is added, and then the DAA unit 406 detects a victim signal from a fast-Fourier-transformed UWB signal that is outputted from the FFT unit 404 in operation S506.

The DAA unit 406 determines whether the victim signal is detected in operation S508. When the victim signal is not detected, the method proceeds to operation S510. In operation S510, the DAA unit 406 checks whether the number of times, the preset frequency offset is repeatedly added, K exceeds the number of iterations N. When K does not exceed N, the DAA unit 406 sets K=K+1 and changes the amount of a preset frequency offset to move the center frequency axis of the frequency bandwidth of the victim signal in operation S512. Subsequently, an operation of detecting the victim signal is repeatedly performed.

Therefore, when an operation that moves the center frequency axis of the victim signal by adding the preset frequency offset is being performed, the victim signal corresponds to one of the FFT subcarriers of the UWB signal and is thereby detected.

When the victim signal is detected from the UWB signal that has been fast-Fourier-transformed by adding the preset frequency offset to the victim signal, the method proceeds to operation S514. In operation S514, the DAA unit 406 then calculates the reception power of the detected victim signal.

Subsequently, the DAA unit 406 compares the reception power with a reference power in operation S516. When it is determined in operation S516 that the reception power of the victim signal is higher than the level of the reference power for an UWB communication, the DAA unit 406 changes an UWB communication channel to another communication channel that does not affect the victim signal, thereby to ensure the UWB communication in operation S518. However, when it is determined in operation S516 that the reception power of the victim signal is lower than the level of the reference power, the method returns to the operation S500.

FIG. 6 is a table showing an experiment result which has been obtained by calculating a detection probability of a victim signal when the DAA apparatus of FIG. 4 detects the victim signal, in accordance with an embodiment of the present invention.

Referring to FIG. 6, for example, when the MB-OFDM UWB receiver having an FFT subcarrier interval of 4.125 MHz adds a preset frequency offset of 1 MHz to a victim signal having a bandwidth narrower than the subcarrier interval where a frequency offset (Foff) of the victim signal is 80 MHz and a frequency bandwidth (Fbw) of the victim signal is 1.75 MHz, it can be seen that the detection probability of the victim signal is very higher at the position of a specific FFT subcarrier according to the added frequency offset.

As described above, the present invention changes the frequency band of a victim signal by arbitrarily adding a frequency offset less than the frequency bandwidth of a victim signal to a UWB signal including the victim signal, and thus accurately detect the victim signal even when the frequency bandwidth of the victim signal is narrower than the subcarrier interval of the UWB signal, in detecting the frequency band position of the victim signal having a narrow band narrower than the subcarrier interval of the MB-OFDM UWB for applying a DAA technology reference that is being discussed for allowing the MB-OFDM UWB in a band of 3.1 GHz to 4.8 GHz.

Moreover, in detecting a victim signal using the FFT module of the MB-OFDM UWB receiver, the embodiment provides an algorithm that detects a victim signal of a narrow band having a frequency bandwidth less than the FFT subcarrier interval of 4.125 MHz by adding an arbitrary frequency offset using the NCO. The algorithm uses FFT and the NCO used in the existing MB-OFDM UWB receiver, and thus does not require additional hardware. Accordingly, the embodiment can accurately determine a subcarrier position in which a victim signal is disposed, thus efficiently executing an avoidance algorithm driven in a tone-nulling scheme.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A Detection And Avoidance (DAA) apparatus for use in a UWB (an ultra wide band) receiver, the DAA apparatus comprising:

an FFT (Fast Fourier Transform) input buffer that temporarily stores a UWB signal including a victim signal;

a frequency offset unit for adding a preset frequency offset to the UWB signal;

an FFT unit for performing a fast-Fourier-transformation on the UWB signal with the frequency offset added thereto; and a DAA unit for detecting a victim signal from the fast-Fourier-transformed UWB signal and, when reception power of the victim signal is higher than a predetermined reference power level, changing a communication channel for the UWB signal to avoid interference.

2. The DAA apparatus of claim 1, wherein the frequency offset unit selects the preset frequency offset within a range less than a frequency bandwidth of the victim signal.

3. The DAA apparatus of claim 1, wherein the frequency offset unit calculates the number of times the preset frequency offset is added, and repeatedly adds the preset frequency offset to the UWB signal by the calculated number of times, wherein the number of times is an integer portion in a value which is obtained by dividing an FFT subcarrier frequency interval of the UWB signal by the preset frequency offset.

4. The DAA apparatus of claim 1, wherein the victim signal is a WiMAX (World Interoperability for Microwave Access) signal.

5. The DAA apparatus of claim 1, wherein the frequency offset unit calculates an amount of a preset frequency offset $\Delta\phi$ which is added to the victim signal, as expressed in the following Equation, $$\Delta\phi = \Delta f \cdot K$$

where, $0 \leq K \leq N$ where $\Delta f$ is the preset frequency offset, K is the number of times the preset frequency offset is added, and N is the number of iterations in which the preset frequency offset is added.

6. A Detection And Avoidance (DAA) method in a UWB (an ultra wide band) receiver, the DAA method comprising:

setting a preset frequency offset within a frequency range less than a frequency bandwidth of a victim signal;

adding the preset frequency offset to the victim signal;

performing a fast-Fourier-transformation on an UWB signal including the victim signal;

detecting a victim signal included in the fast-Fourier-transformed UWB signal;

measuring reception power of the detected victim signal to check whether reception power of the detected victim signal is higher than a predetermined reference level; and changing a communication channel for the UWB signal when the reception power of the detected victim signal is higher than the predetermined reference level.

7. The DAA method of claim 6, further comprising again adding the preset frequency offset to the victim signal when the victim signal has not been detected.

8. The DAA method of claim 6, wherein the preset frequency offset is added the number of predetermined times, and the number of predetermined times is an integer portion in a value which is obtained by dividing an FFT (Fast Fourier Transform) subcarrier frequency interval of the UWB signal by the preset frequency offset.

9. The DAA method of claim 6, wherein the preset frequency offset is calculated as expressed in the following Equation, $$\Delta\phi = \Delta f \cdot K$$

where, $0 \leq K \leq N$ where $\Delta f$ is the preset frequency offset, K is the number of times the preset frequency offset is added, and N is the number of iterations in which the preset frequency offset is added.

10. The DAA method of claim 6, wherein the victim signal is a WiMAX (World Interoperability for Microwave Access) signal.

* * * * *